United States Patent [19]
Soirinsuo et al.

[11] Patent Number: 6,148,001
[45] Date of Patent: Nov. 14, 2000

[54] MULTIPOINT-TO-POINT SYSTEM WHICH MULTIPLEXES COMPLETE PACKETS COMPRISED OF ATM CELLS ON TO A SINGLE VIRTUAL CHANNEL CONNECTION

[75] Inventors: Timo Soirinsuo; Pasi Vaananen, both of Cambridge, Mass.

[73] Assignee: Nokia Telecommunications, Oy, Espoo, Finland

[21] Appl. No.: 08/873,330

[22] Filed: Jun. 12, 1997

[51] Int. Cl.$^7$ .......................... H04L 12/28; H04L 12/56; H04L 12/54; H04J 3/24
[52] U.S. Cl. .......................... 370/420; 370/395; 370/428; 370/473
[58] Field of Search .................................. 370/235, 236, 370/248, 389, 390, 394, 395, 432, 397, 399, 428, 412, 468, 473, 474, 413, 420

[56] References Cited

U.S. PATENT DOCUMENTS

| | | | |
|---|---|---|---|
| 5,335,224 | 8/1994 | Cole et al. | 370/84 |
| 5,530,806 | 6/1996 | Condon et al. | 395/185.02 |
| 5,629,928 | 5/1997 | Calvignac et al. | 370/237 |
| 5,764,641 | 6/1998 | Lin | 370/412 |

OTHER PUBLICATIONS

Grossglauser et al., "SEAM: Scalable and Efficient ATM Multipoint–to–Multipoint Multicasting", NOSSDAV Presentation, Apr. 1996, (pp. 1–17).
Grossglauser et al., "SEAM: Scalable and Efficient ATM Multicast", Dec. 19, 1996, INFOCOM '97, Apr. 7–11, 1997 in Kobe, Japan, (5 pages).
Ren et al., "Performance Evaluation of Multipoint–Point ABR and UBR", ATM–Forum, Oct. 7–11, 1996, (pp. 1–15).
Grossglauser et al., "SEAM: A Scheme for Scalable and Efficient ATM Multipoint–to–Multipoint Communication", Contribution to ATM Forum, Aug. 19–23, 1996, Baltimore, M.D., (4 pages).

*Primary Examiner*—Douglas W. Olms
*Assistant Examiner*—David R Vincent
*Attorney, Agent, or Firm*—Altera Law Group, LLC

[57] ABSTRACT

A method and apparatus for supporting connections on multipoint-to-point topologies is disclosed. A cell scheduler schedules packets from incoming VCCs for transmission on the order that a complete frame is available. Cells are received from a plurality of virtual channel connections. The cells for each of the virtual channel connections are stored in a buffer until a complete packet has been received. When a buffer accumulates a complete packet of cells for one of the virtual channel connections, the cells are scheduled for transmission. A complete packet is determined by looking at a packet type identification field. Cells forming a first packet for a first virtual channel connection are transmitted continuously until all the cells have been transmitted. A next available complete packet of cells is transmitted after the first packet of cells has been transmitted. A determination is made whether a cell is a data cell, an OAM cell, a Resource Management cell or a reserved cell. When a cell is determined to be an OAM cell, a Resource Management cell or a reserved cell, the buffered cells are dropped, moved to a bypass queue or handled as other cells.

18 Claims, 10 Drawing Sheets

| Layer Name | | Functions Performed | |
|---|---|---|---|
| Higher Layers | | Higher Layer Functions | L a y e r  M a n a g e m e n t |
| A A L | Convergence Sublayers (CS) | Common Part (CP) | |
| | | Service Specific (SS) | |
| | SAR Sublayer | Segmentation And Reassembly | |
| ATM | | Generic Flow Control<br>Call Header Generation/Extraction<br>Cell VCI/VPI Translation<br>Cell Multiplexing/Demultiplexing | |
| P h y s i c a l | Transmission Convergence (TC) Sublayer | Cell Rate Decoupling<br>Cell Delineation<br>Transmission Frame Adaption<br>Transmission Frame Generation/Recovery | |
| | Physical Medium (PM) | Bit Timing<br>Physical Medium | |

Fig. 2

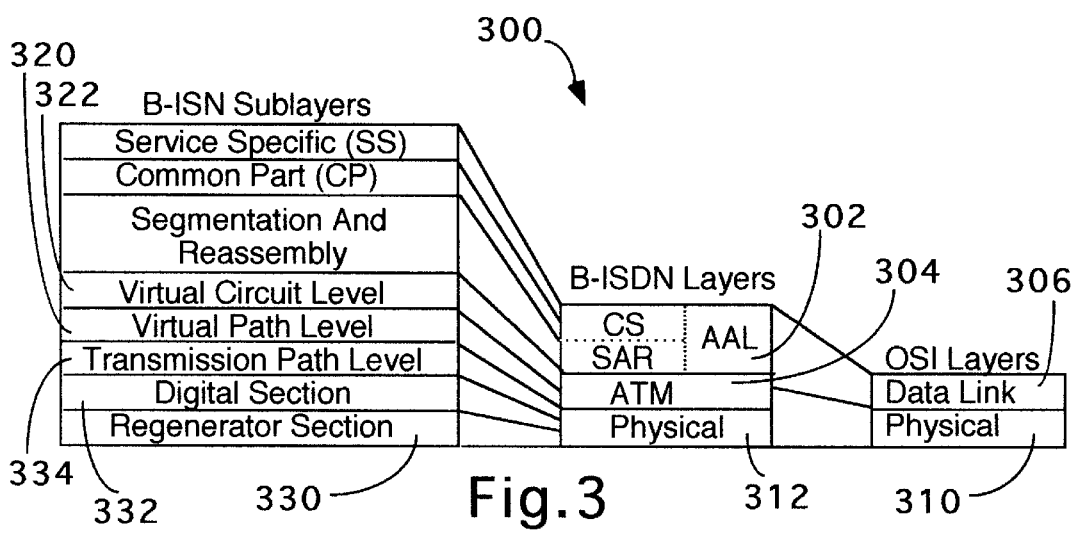

Fig. 3

MULTIPOINT-TO-POINT SYSTEM WHICH MULTIPLEXES COMPLETE PACKETS COMPRISED OF ATM CELLS ON TO A SINGLE VIRTUAL CHANNEL CONNECTION

BACKGROUND OF THE INVENTION

1. Field of the Invention.

This invention relates in general to cell relay devices, and more particularly to a method and apparatus for supporting connections on multipoint-to-point topologies.

2. Description of Related Art.

Cell relay refers to any data communications technology that is based on transmission of small, fixed-length data units called cells. Cells are made up of a header field, containing address information, and an information field, carrying user data. With cell relay, a cell converter takes the constant-bit-rate streams of voice and video devices and the variable-bit-rate streams of data devices and converts them into cells. These cells are then routed across a cell relay network to multiple destinations, based on the address information in the headers. At each destination, other cell converters recreate the bit streams and deliver them to the user devices. With cell relay, separate applications can be consolidated onto a single, higher speed network, improving overall price/performance. Furthermore, because a cell relay network is based on switching fixed-length data units, it is possible to build high performance switching fabrics supporting burst rates of hundreds of megabits per second.

Asynchronous Transfer Mode (ATM) is just one example of a cell-based switching and multiplexing technology. ATM is designed to be a general-purpose, connection-oriented transfer mode for a wide range of services. Today, ATM is being used on local area networks (LANs), metropolitan area networks (MANs) and wide area networks (WANs). As a result, ATM is rapidly becoming the premier protocol for many communication and networking applications. With ATM installed on LANS, MANs and WANs, all types of voice, data and video traffic can operate together seamlessly. No other protocol offers this seamless integration of information, making ATM a catalyst for technological advances in telecommunications, multimedia and other markets.

ATM handles both connection-oriented traffic and connectionless traffic through the use of adaptation layers. Typically, ATM virtual connections operate at either a Constant Bit Rate (CBR) or a Variable Bit Rate (VBR). Each ATM cell sent into the network contains addressing information that establishes a virtual connection from origination to destination. All cells are then transferred, in sequence, over this virtual connection. ATM provides either Permanent or Switched Virtual Circuits (PVCs or SVCs). ATM is asynchronous because the transmitted cells need not be periodic as time slots of data as in Synchronous Transfer Mode (STM).

ATM offers the potential to standardize on one network architecture, which defines the multiplexing and switching method. ATM also supports multiple Quality of Service (QoS) classes for differing application requirements on delay and loss performance. Thus, the vision of ATM is that an entire network can be constructed using ATM and ATM Application Layer (AAL) switching and multiplexing principles to support a wide range of all services, such as:

Voice

Packet data (Switched MultiMegabit Data Service (SMDS), Internet Protocol (IP), Frame Relay (FR)

Video

Imaging

Circuit emulation

ATM also provides bandwidth-on-demand through the use of SVCs, and also supports LAN-like access to available bandwidth.

ATM standards define a fixed-size cell with a length of 53 octets (or bytes) comprised of a 5-octet header and a 48-octet payload. With a relatively small cell size, ATM is a compromise between the long frames generated in data communications and the short, repetitive transmissions required for voice communications, video transmission and other isochronous data transmission.

The bits in the cells are transmitted over the transmission path in a continuous stream. Cells are mapped into a physical transmission path, such as the North American Digital Signal Level 1 (DS1), DS3, or SONET; International Telecommunications Union—Telecommunications standardization sector (ITU-T) STM standards; and various other local fiber and electrical transmission payloads.

All information is switched and multiplexed in an ATM network using these fixed-length cells. The cell header identifies the destination, cell type, and priority. The fixed cell size simplifies the implementation of ATM switches and multiplexers while providing very high speeds.

When using ATM, longer packets cannot delay shorter packets as in other switched implementations because long packets are chopped up into many cells. This enables ATM to carry Constant Bit Rate (CBR) traffic such as voice and video in conjunction with Variable Bit-Rate (VBR) data traffic, potentially having very long packets within the same network.

Three major concepts in ATM are: the transmission path, the Virtual Path (VP), and, optionally, the Virtual Channel (VC). These form the basic building blocks of ATM. A physical transmission path contains one or more virtual paths (VPs), while each virtual path contains one or more Virtual Channels (VCs). Thus, multiple virtual channels can be trunked on a single virtual path. Switching can be performed on either a transmission path, virtual path, or virtual circuit (i.e., channel) level.

This capability to switch down to a virtual channel level is similar to the operation of a Private or Public Branch Exchange (PBX) or telephone switch in the telephone world. In the PBX/switch, each channel within a trunk group (path) can be switched. Devices which perform VC connections are commonly called VC switches because of this analogy with telephone switches. Transmission networks use a cross-connect, which is basically a space division switch, or effectively an electronic patch panel. ATM devices which connect VPs are commonly called VP cross-connects by analogy with the transmission network.

At the ATM layer, users are provided a choice of either a Virtual Path Connection (VPC) or a Virtual Channel Connection (VCC). VPCs are switched based upon the Virtual Path Identifier (VPI) value only. The users of the VPC may assign the VCCs within that VPI transparently since they follow the same route. VCCs are switched upon the combined VPI and Virtual Channel Identifier (VCI) value.

Both VPIs and VCIs are used to route cells through the network. It should be noted that VPI and VCI values must be unique on a specific transmission path (TP). Thus, each transmission path between two network devices (such as ATM switches) uses VPIs and VCIs independently.

ATM is a scaleable standard that does not specify requirements for transmission rates, framing and physical layers. Rather, ATM switching and ATM networks refer only to the handling of cells. ATM does not dictate the content of information carried in cells. Accordingly, broadband networks must develop guarantees on bandwidth, delay and jitter to support a wide variety of ATM applications.

As mentioned earlier, the ATM Adaptation Layer (AAL) is used to assemble and reassemble packets into/from cells. For this purpose, four standards, AAL-1 through AAL-4, were initially defined to directly map to AAL service classes A through D. Class A is designated for constant bit-rate (CBR) service. Class B is for variable bit-rate (VBR) service with end-to-end timing, and is connection-oriented. Class C is for variable bit-rate (VBR) service with no timing required, and is connection-oriented. Finally, Class D is for variable bit-rate (VBR) service with no timing required, and supports connectionless topologies.

ALL-5 was conceived by the computer industry in response to perceived complexity and implementation difficulties in the AAL-3/4. While the AAL-3/4 provides a rich set of services, it does so at the expense of additional protocol overhead and processing. However, AAL-3/4 supports the multiplexing of the traffic originating from the multiple sessions or connections onto the same ATM virtual channel connection. Multiplexing capability requires the use of four bytes of each ATM cell for supporting the overhead information required for data encapsulation. Accordingly, AAL-3/4 is not widely used because of this extra overhead.

AAL-5 was designed to provide similar services to AAL-3/4, but with lower overhead. The problem with the AAL-5 is that it does not support the multiplexing of several connections onto the same VCC. Since individual cells of each AAL-5 packet are sent as a consecutive stream, AAL-5 does not have any information on the cell level to tell that the cells belong to the same AAL-5 packet.

Still, AAL-5 packet multiplexing would be useful, on environments, where traffic originating from many sources could be aggregated onto the same VCC connection to save the amount of VCCs required. This situation is common, e.g. in all kinds of recently proposed Cell Switched Router environments.

It can be seen that there is a need for a method and apparatus for supporting the multiplexing of packets on a single virtual channel connection to save on the number of virtual channel connections used.

It can also be seen that there is a need for a cell scheduler that, for the same priority connections, schedules packets from incoming VCCs for transmission on the order they have all cells for a packet available.

SUMMARY OF THE INVENTION

To overcome the limitations in the prior art described above, and to overcome other limitations that will become apparent upon reading and understanding the present specification, the present invention discloses a method and apparatus for supporting connections on multipoint-to-point topologies.

The present invention solves the above-described problems by providing a cell scheduler that, for the same priority connections, schedules packets from incoming VCCs for transmission on the order they have all cells available.

A system in accordance with the principles of the present invention receives cells from a plurality of virtual channel connections, stores the cells for each of the virtual channel connections in a buffer until a complete packet has been received, identifies when a buffer accumulates a complete packet of cells for one of the virtual channel connections and determines a schedule for transmitting the cells for that virtual channel connection. The cells are scheduled for transmission in the order that the buffers accumulate a complete packet.

Other embodiments of a system in accordance with the principles of the invention may include alternative or optional additional aspects. One such aspect of the present invention is that a buffer containing a complete packet of cells is determined by looking at a packet type identification field in the cells.

Another aspect of the present invention is that the cells are transmitted continuously according to the schedule.

Another aspect of the present invention is that the cells forming a first packet for a first virtual channel connection are transmitted until all the cells of the first packet from the first virtual channel connection have been transmitted.

Another aspect of the present invention is that a next complete packet of cells available is transmitted after the first packet of cells has been transmitted.

Another aspect of the present invention is that a determination is made whether a cell is a data-cell, an Operations and Maintenance cell, Resource Management cell or reserved cell.

Another aspect of the present invention is that when a cell is determined to be an Operations and Main tenance cell, Resource Management cell or reserved cell, the buffered cells are dropped.

Another aspect of the present invention is that the buffered cells are moved to a bypass queue when the cells are determined to be an Operations and Maintenance cell, Resource Management cell or a Reserved Type of cell.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 2 illustrates four Broadband-Integrated Services Digital Network/Asynchronous Transfer Mode (B-ISDN/ATM) layers along with the sublayer structure of the ATM Adaptation Layer (AAL) and Physical (PHY) layer;

FIG. 3 illustrates the mapping of the B-ISDN layers to the OSI layers and the sublayers of the PHY, ATM, and ATM Adaptation layers;

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method and apparatus for supporting connections on multipoint-to-point topologies. Cells are received from a plurality of virtual channel connections and the cells for each of the virtual channel connections are stored in a buffer until a complete packet has been received. When a buffer accumulates a complete packet of cells for one of the virtual channel connections, the cells are scheduled for transmission. Accordingly, a cell scheduler schedules packets from incoming VCCs for transmission on the order that a complete frame is available.

Figure 1:
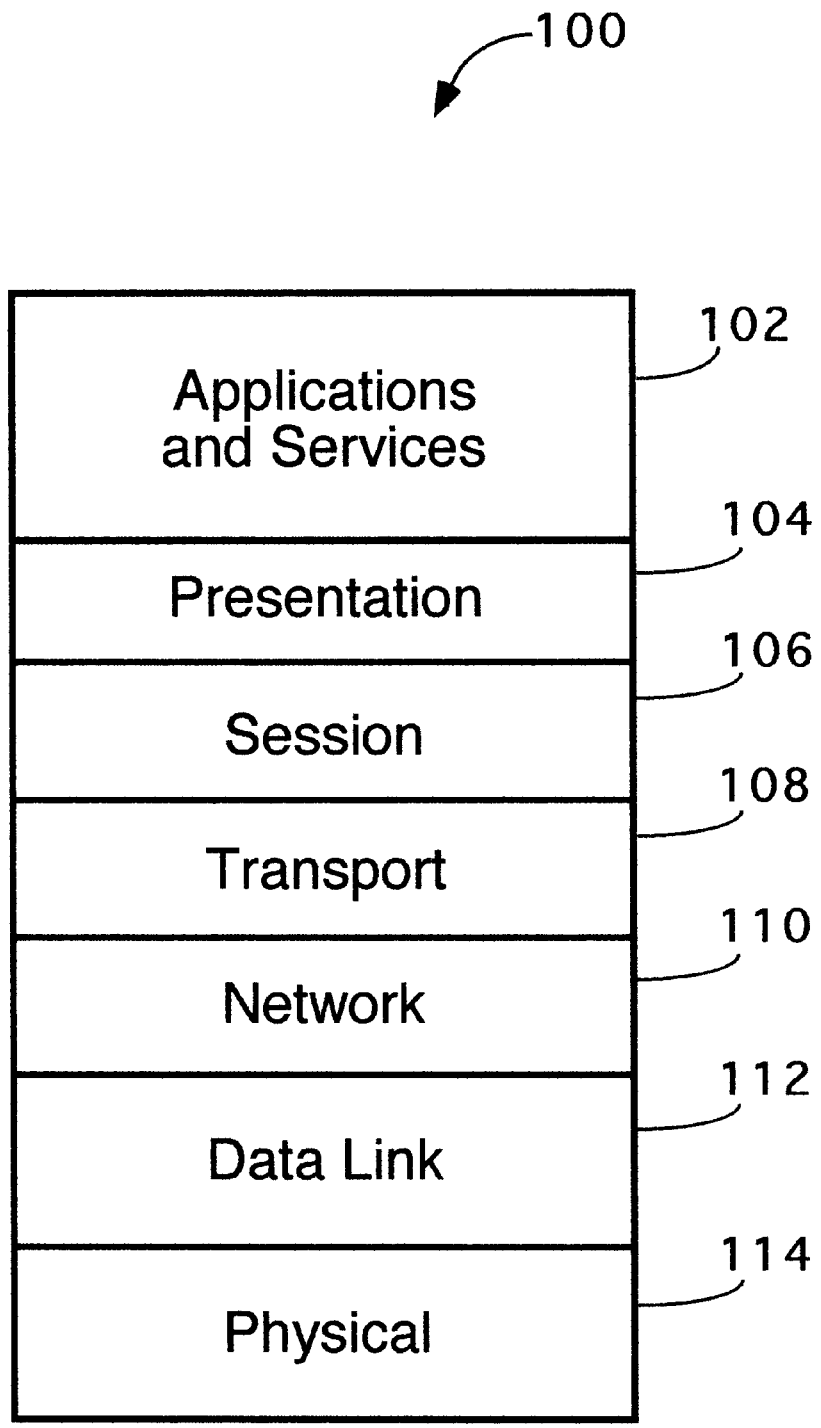
FIG. 1 illustrates the seven layer Open Systems Interconnection (OSI) model.

As will be appreciated by those skilled in the art, communication networks (e.g., ATM) and their operations can be described according to the Open Systems Interconnection (OSI) model 100 which includes seven layers including an application 102, presentation 104, session 106, transport 108, network 110, link 112, and physical 114 layer as illustrated in FIG. 1. The OSI model 100 was developed by the International Organization for Standardization (ISO) and is described in "The Basics Book of OSI and Network Management" by Motorola Codex from Addison-Wesley Publishing Company, Inc., 1993 (First Printing September 1992).

Each layer of the OSI model 100 performs a specific data communications task, a service to and for the layer that precedes it (e.g., the network layer provides a service for the transport layer). The process can be likened to placing a letter in a series of envelopes before it's sent through the postal system. Each succeeding envelope adds another layer of processing or overhead information necessary to process the transaction. Together, all the envelopes help make sure the letter gets to the right address and that the message received is identical to the message sent. Once the entire package is received at its destination, the envelopes are opened one by one until the letter itself emerges exactly as written.

In a data communication transaction, however, each end user is unaware of the envelopes, which perform their functions transparently. Each time that user application data passes downward from one layer to the next layer in the same system, more processing information is added. When that information is removed and processed by the peer layer in the other system, it causes various tasks (error correction, flow control, etc.) to be performed.

The ISO has specifically defined all seven layers, which are summarized below in the order in which the data actually flow as they leave the source:

Layer 7, the application layer 102, provides for a user application (such as getting money from an automatic bank teller machine) to interface with the OSI application layer 102. That OSI application layer 102 has a corresponding peer layer in the other open system, the bank's host computer.

Layer 6, the presentation layer 104, makes sure the user information (a request for $50 in cash to be debited from your checking account) is in a format (i.e., syntax or sequence of ones and zeros) the destination open system can understand.

Layer 5, the session layer 106, provides synchronization control of data between the open systems (i.e., makes sure the bit configurations that pass through layer 5 106 at the source are the same as those that pass through layer 5 106 at the destination).

Layer 4, the transport layer 108, ensures that an end-to-end connection has been established between the two open systems and is reliable (i.e., layer 4 108 at the destination confirms the request for a connection, so to speak, that it has received from layer 4 108 at the source).

Layer 3, the network layer 110, provides routing and relaying of data through the network (among other things, at layer 3 110 on the outbound side an address gets slapped on the envelope which is then read by layer 3 110 at the destination).

Layer 2, the data link layer 112, includes flow control of data as messages pass down through this layer in one open system and up through the peer layer in the other open system.

Layer 1, the physical interface layer 114, includes the ways in which data communications equipment is connected mechanically and electrically, and the means by which the data move across those physical connections from layer 1 114 at the source to layer 1 114 at the destination.

This same layering principals have been applied to ATM communication networks. FIG. 2 shows four Broadband-Integrated Services Digital Network/Asynchronous Transfer Mode (B-ISDN/ATM)layers 210 along with the sublayer structure of the ATM Adaptation Layer (AAL) 240 and Physical (PHY) layer 260. Starting from the bottom, the Physical layer 260 has two sublayers: Transmission Convergence (TC) 262 and Physical Medium (PM) 264. The PM sublayer 264 interfaces with the actual physical medium and passes the recovered bit stream to the TC sublayer. The TC sublayer 262 extracts and inserts ATM cells within the Plesiochronous or Synchronous (PDH or SDH) Time Division Multiplexed (TDM) frame and passes these to and from the ATM layer, respectively.

The ATM layer 210 performs multiplexing, switching, and control actions based upon information in the ATM cell header and passes cells to, and accepts cells from, the ATM Adaptation Layer (AAL) 240. The AAL 240 has two sublayers: the Segmentation And Reassembly (SAR) sublayer 242 and the Convergence Sublayer (CS) 250. The CS 250 is further broken down into Common Part (CP) 252 and Service-Specific (SS) 254 components. The AAL 240 passes Protocol Data Units (PDUs) to and accepts PDUs from higher layers 270. PDUs may be of variable length, or may be of fixed length different from the ATM cells length.

The Physical layer 260 corresponds to layer 1 114 in the OSI model illustrated in FIG. 1. The ATM layer 210 and AAL 240 correspond to parts of OSI layer 2 112, but the address field of the ATM cell header has a network-wide connotation that is like OSI layer 3 110. The B-ISDN and ATM protocols and interfaces make extensive use of the OSI concepts of layering and sublayer.

FIG. 3 illustrates the mapping 300 of the B-ISDN layers to the OSI layers and the sublayers of the PHY, ATM, and ATM Adaptation layers. FIG. 3 illustrates that the AAL layer 302 and ATM layer 304 do not match exactly with the data link layer 306 of the OSI model. Furthermore, FIG. 3 illustrates that the functions of the physical layer 310 of the OSI model do not map precisely to the physical layer 312 of the B-ISDN model.

The following describes the Asynchronous Transfer Mode (ATM) layer 304. To construct and interpret ATM Virtual Paths (VPs) and Virtual Channels (VCs), the ATM layer includes a virtual path sublayer 320 and Virtual Channel layer 322. The physical layer 312 is composed of three levels: regenerator section 330, digital section 332, and transmission path 334. At the ATM layer 304, the transmission path is the main area of focus because this is essentially the TDM payload that connects ATM devices. Generically, an ATM device may be either an endpoint or a connecting point for a VP or VC. A Virtual Path Connection (VPC) or a Virtual Channel Connection (VCC) exists only between endpoints. A VP link or a VC link can exist between an endpoint and a connecting point or between connecting points. A VPC or VCC is an ordered list of VP or VC links, respectively, that define a unidirectional flow of ATM cells from one user to one or more other users.

Several key functions are performed by each sublayer of the ATM layer 304. The ATM layer 304 provides many functions, including:

Cell Construction

Cell Reception and Header Validation

Cell Relaying, Forwarding, and Copying Using the VPI/VCI

Cell Multiplexing and Demultiplexing Using the VPI/VCI

Cell Payload Type Discrimination

Interpretation of pre-defined Reserved Header Values

Cell Loss Priority Processing

Support for Multiple QoS Classes

Usage Parameter Control (UPC)

Explicit Forward Congestion Indication (EFCI)

Generic Flow Control

Connection Assignment and Removal

The attributes of the service class for AAL 302 are the timing relationships required between the source and destination, whether the bit rate is constant or variable, and whether the connection mode is connection-oriented or connectionless. The four AAL service classes are as follows:

Class A—constant bit-rate (CBR) service with end-to-end timing, connection-oriented Class B—variable bit-rate (VBR) service with end-to-end timing, connection-oriented Class C—variable bit-rate (VBR) service with no timing required, connection-oriented Class D—variable bit-rate (VBR) service with no timing required connectionless As mentioned earlier, AAL-1 through AAL-4 were initially defined to directly map to the AAL service classes A through D. AAL-5 was conceived by the computer industry in response to perceived complexity and implementation difficulties in the AAL-3/4. While the AAL-3/4 provides a rich set of services, it does so at the expense of additional protocol overhead and processing. AAL-5, originally coined the Simple and Efficient Adaptation Layer (SEAL), was designed to provide similar services at lower overhead. AAL-5 takes advantage of the ATM End of Message (EOM) flag to signal the end of a single message. Significant overhead is eliminated by removing the SAR header and trailer.

The problem with AAL-5 is that it does not support the multiplexing of several connections onto the same VCC. Individual cells of each AAL-5 packet are sent as a consecutive stream, and AAL-5 does not provide any information at the cell level to indicate that the cells belong onto the same AAL-5 packet.

However, AAL-5 is merely one example where packet multiplexing could be used to aggregate traffic from multiple sources onto the same VCC connection to save the amount of VCCs required. Those skilled in the art will recognize that the present invention is applicable in any cell relay environment where an End of Message (EOM) flag is used to signal the end of a single message. Nevertheless, for purposes of illustration, the invention will be describe with reference to the AAL-5 standard.

Figure 4:
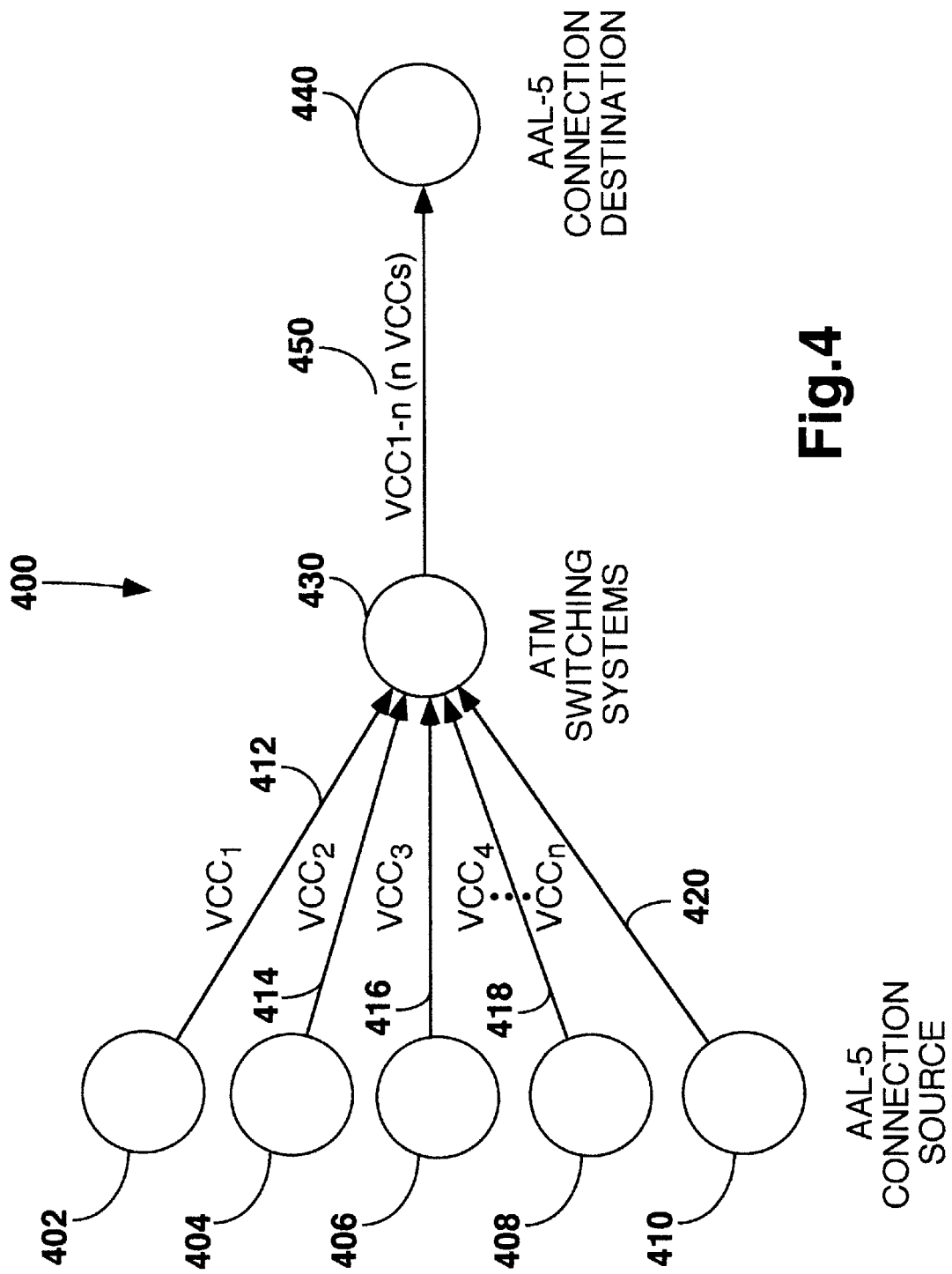
FIG. 4 illustrates the cell interleaving in AAL-5 multipoint-to-point topologies.

FIG. 4 illustrates the cell interleaving 400 in AAL-5 multipoint-to-point topologies. In FIG. 4, n AAL-5 connection services 402–410 establish a VCC 412–420 with an ATM switching system 430. The ATM switching system 430 then routes the cells from each AAL-5 connection source 402–410 to an AAL-5 connection destination 440 by using n VCCs 450. It can be seen then, that AAL-5 packet multiplexing would be useful in environments having traffic originating from many sources and that needs to be aggregated onto the same VCC connection to save the amount of VCCs required. This multipoint-to-point problem occurs in ReSerVation Protocol (RSVP) and several methods for carrying IP traffic on top of ATM links.

Figure 5:
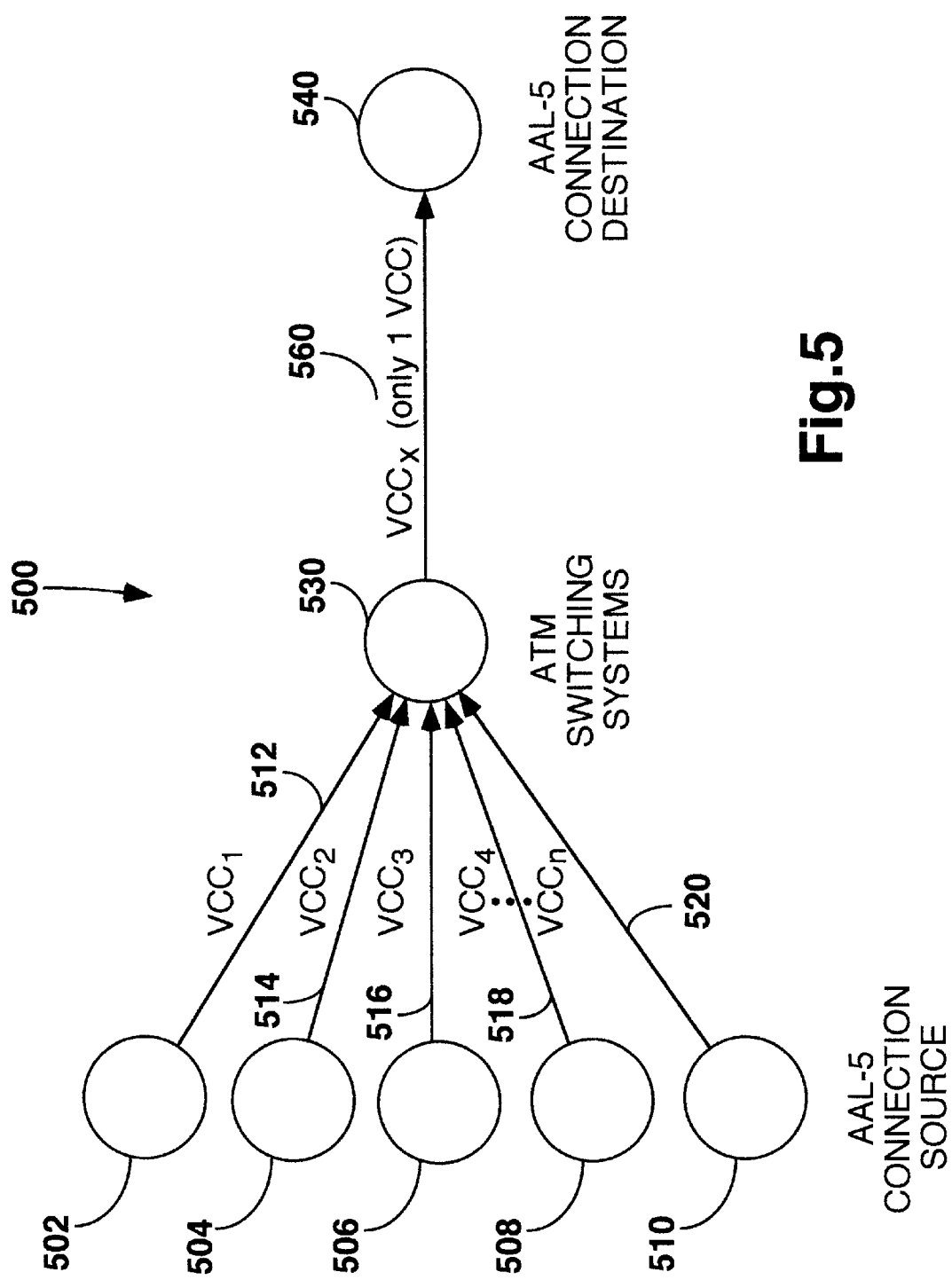
FIG. 5 illustrates a multipoint-to-point topology according to the present invention.

FIG. 5 illustrates a multipoint-to-point topology 500 according to the present invention. Similar to FIG. 4, FIG. 5 shows n AAL-5 connection services 502–510 establishing a VCC 512–520 with an ATM switching system 430. The ATM switching system 530 then routes the cells from each AAL-5 connection source 502–510 to an AAL-5 connection destination 540. However, the present invention modifies the scheduler function of the buffer management subsystem so that AAL-5 packets will be scheduled for transmission only after the last cell of the packet has arrived on the output cell buffer, thereby facilitating the use of only one VCC 560.

Furthermore, for the same priority connections, packets are scheduled for transmission on the order they have all cells available. Then the packet is sent continuously, until all cells of given packets have been sent. This mechanism can be implemented as stand-alone chip on the output data path, or integrated on the switch buffer management.

Figure 6:
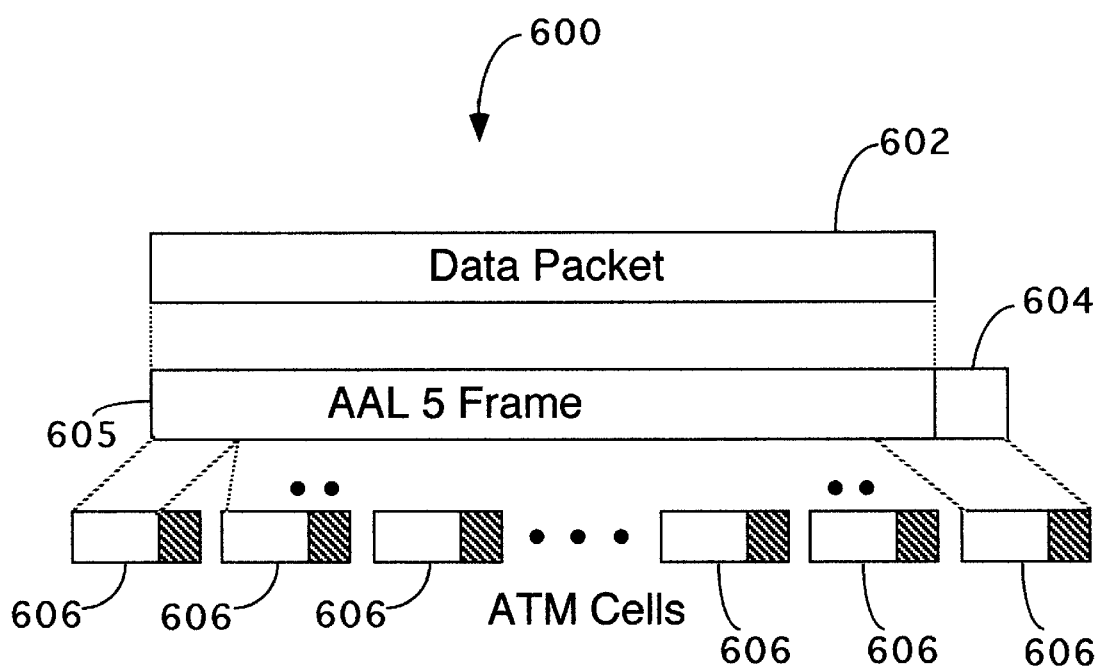
FIG. 6 illustrates an AAL-5 frame being broken down into ATM cells.

FIG. 6 illustrates an AAL-5 frame being broken down into ATM cells 600. Initially, a data packet 602 is received at the ATM Adaptation Layer where a header 604 is attached to the data packet to form the AAL-5 PDU 605. The AAL-5 PDU 605 is then segmented into 48 octet ATM cells 606.

Figure 7:
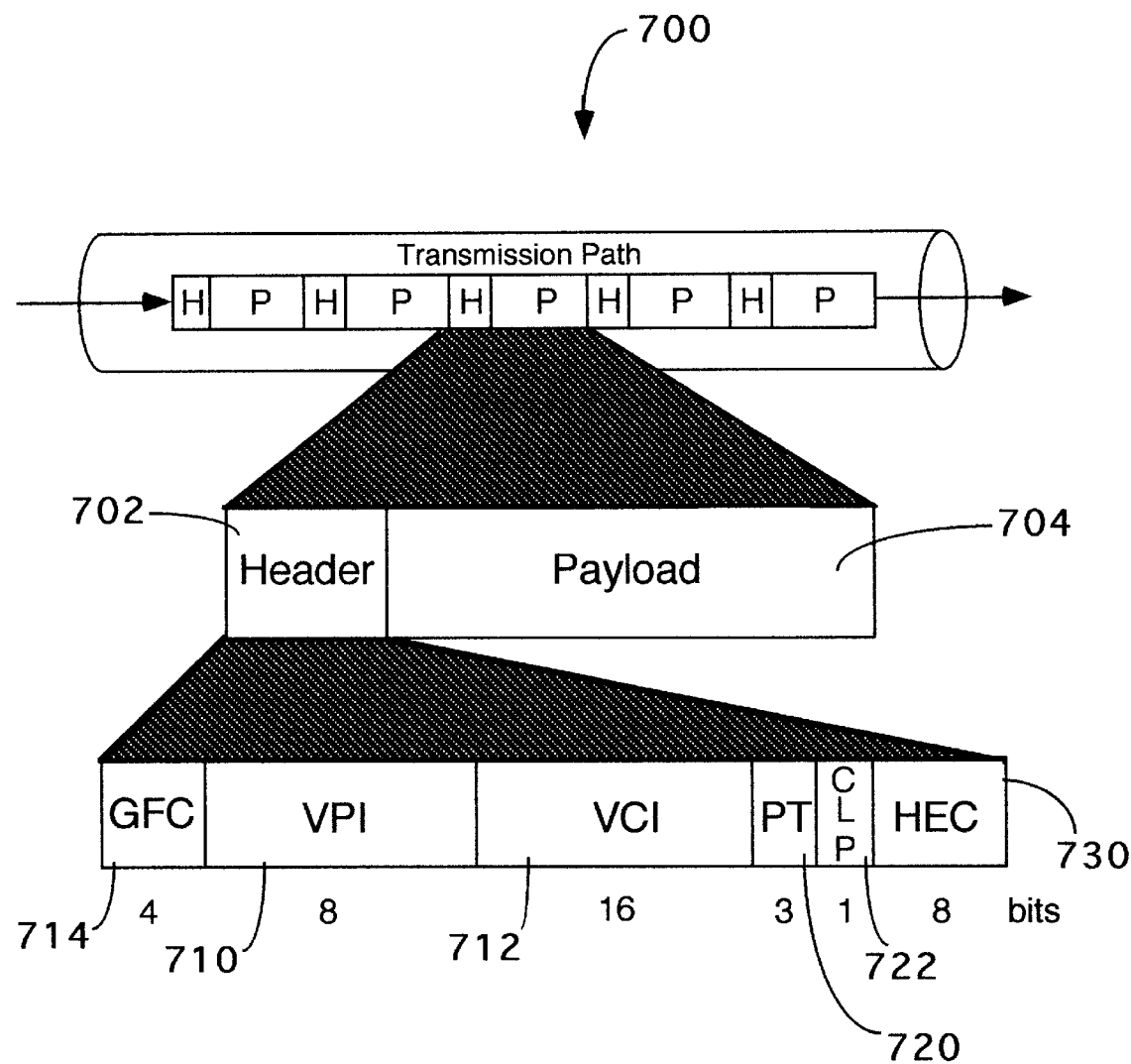
FIG. 7 illustrates an ATM cell.

FIG. 7 illustrates the format 700 for an ATM cell. The ATM standards define a fixed-size cell with a length of 53 octets comprised of a 5 octet header 702 and a 48 octet payload 704. The bits for a packet are transmitted over the transmission path in a continuous stream. All information is switched and multiplexed in an ATM network in these fixed-length cells. The cell header 702 identifies the destination, cell type and priority. The Virtual Path Identifier (VPI) 710 and Virtual Channel Identifier (VCI) 712 hold local significance only, and identify the destination. The Generic Flow Control (GFC) field 714 allows a multiplexer to control the rate of an ATM terminal. The Payload Type (PT) 720 indicates whether the cell contains user data, signaling data, or maintenance information. The Cell Loss Priority (CLP) 722 indicates the relative priority of the cell. Lower priority cells are discarded before higher priority cells during congested intervals. Finally, a Header Error Check (HEC) 730 is provided to detect and correct errors in the header.

The Virtual Channel Identifier (VCI) 712 in the cell header identifies a single VC on a particular Virtual Path (VP). Switching at a VC connecting point is done based upon the combination of VP and VCI 712. A VC link is defined as a unidirectional flow of ATM cells with the same VCI 712 between a VC connecting point and either a VC endpoint or another VC connecting point. A VC endpoint also is called an ATM Service Access Point (SAP).

The present invention uses the End of Message (EOM) flag to signal the end of a single message. In one particular embodiment of the invention, Payload Type (PT) identification codes are used to identify the reception of the complete packet. The reception of a complete packet can be identified by the AUU of the last cell of the packet being marked as "1". The least significant bit of the PT field provides the AUU indication. The state is maintained for each incoming VCC, which indicates whether the buffer of that VCC contains one or more complete AAL-5 packet.

Figure 8:
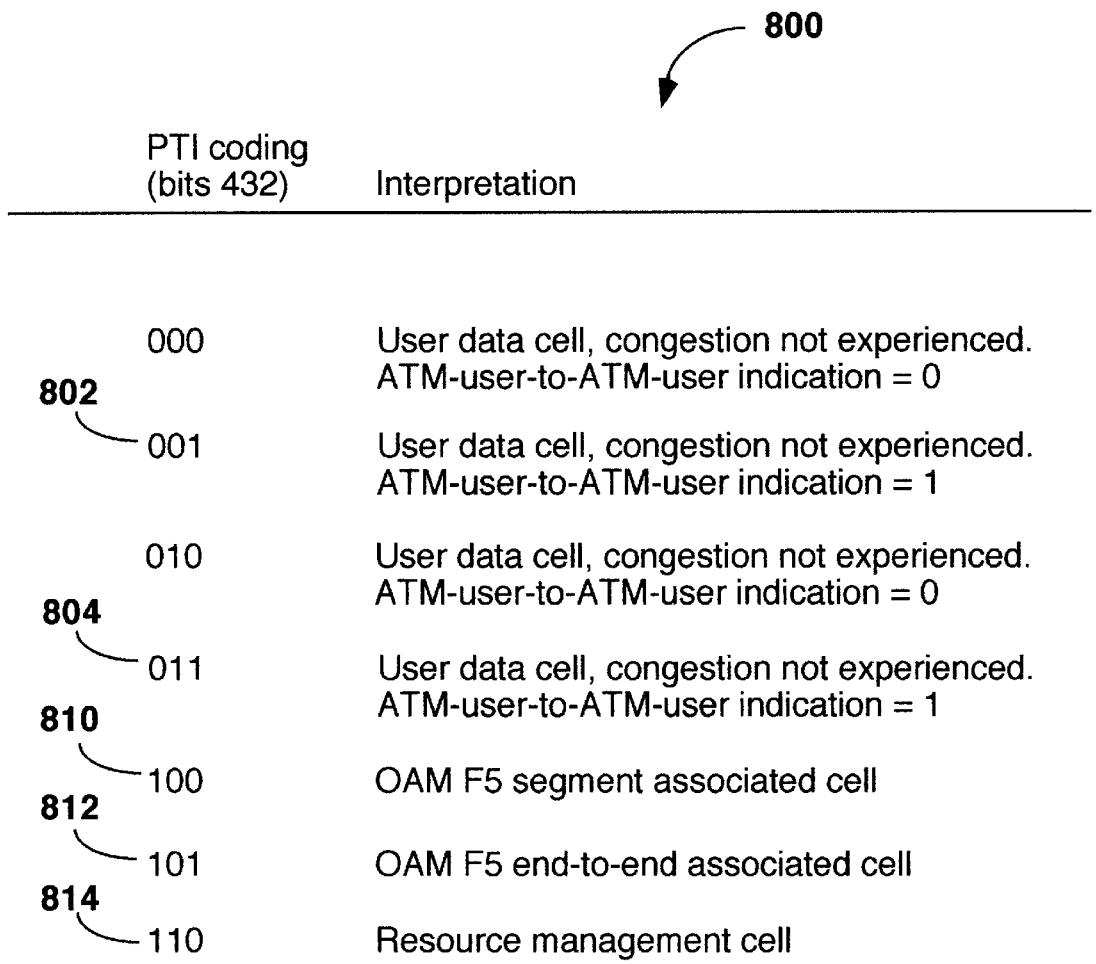
FIG. 8 illustrates a chart of PT identification codes.

FIG. 8 illustrates a chart 800 of PT identification codes. When the cell is received for buffering on a VCC which output is going on the VCC where packets are multiplexed, lookup for the PT identification field is performed. For PT identification codepoints "001" 802 and "011" 804, the buffer state is updated to indicate that the buffer contains a complete packet.

For the Operations and Maintenance (OAM), resource management (RM) and reserved cells (PT identification code points "100" 810, "101" 812, and "110" 814), there are three options which can be programmed on incoming VCC basis. These options are: drop cell, buffer cell as an ordinary cell, or move the cell to a bypass queue. This is because the network topology does not necessarily form symmetrical trees (no associated return path to each source), and the OAM and RM mechanisms don't work in such topologies.

Figure 9:
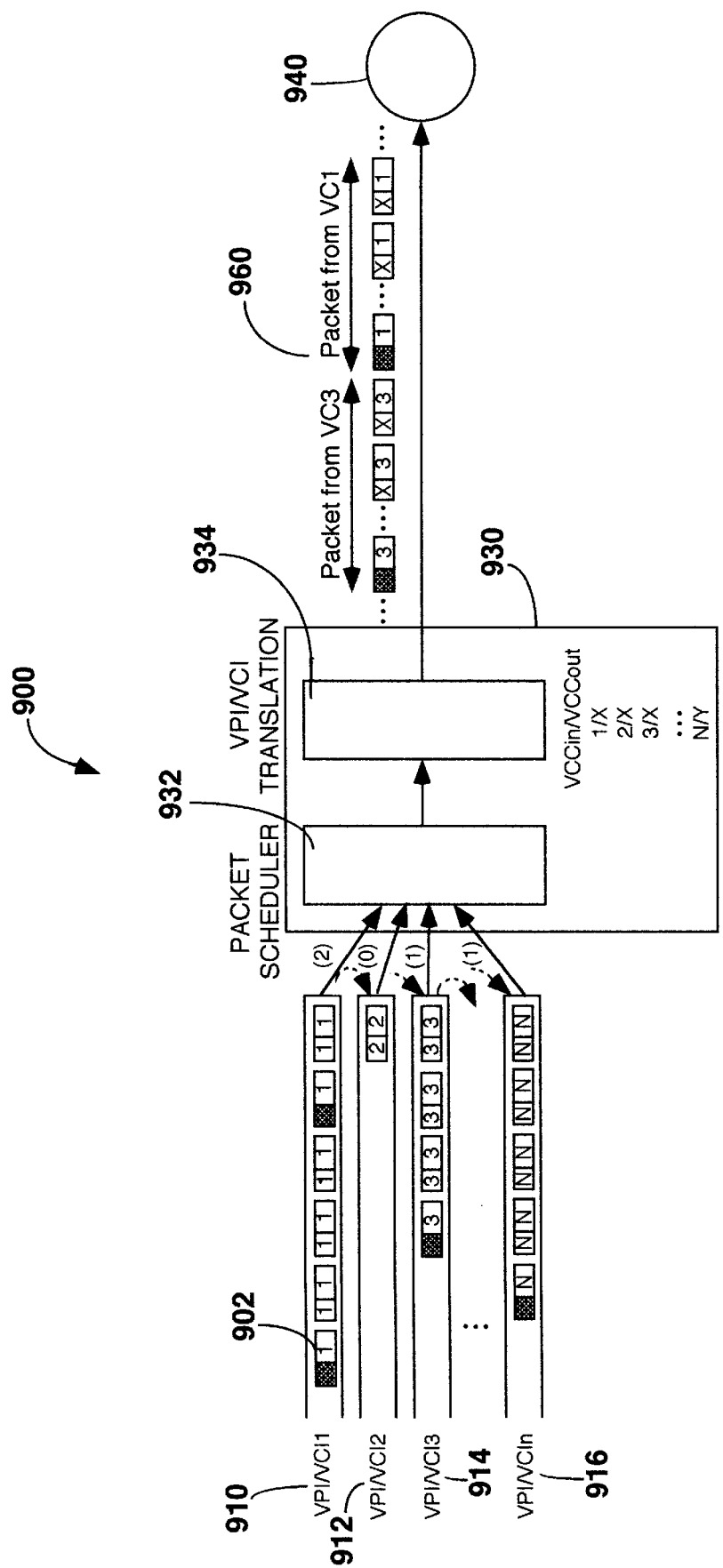
FIG. 9 is a functional diagram illustrating the process of scheduling packets from incoming VCCs for transmission on the order that complete cells become available.

FIG. 9 is a functional diagram 900 illustrating the process of scheduling packets 902 from incoming VCCs 910–916 for transmission on the order that complete cell are available. The incoming VCCs 910–916 are from n connection services that have established a VCC with an intermediate entity 930 as, for example, was discussed with reference to FIG. 5. The intermediate entity 930 includes a controller having a packet scheduler 932 and a VPI/VCI translation entity 934. The ATM intermediate device 930 routes the cells from each connection source 910–916 to a connection destination 940 by using a single VCC 960. Accordingly, traffic originating from many sources 910–916 is aggregated onto the same VCC connection 960 to save the number of VCCs required. Packets from the incoming VCCs 910–916 are scheduled for transmission on the order they have all cells available. After the scheduler 932 schedules the transmission of a packet, the packet is sent continuously, until all cells of that packet have been sent. Then, a complete packet of another VC, which next becomes available, is transmitted.

Figure 10:
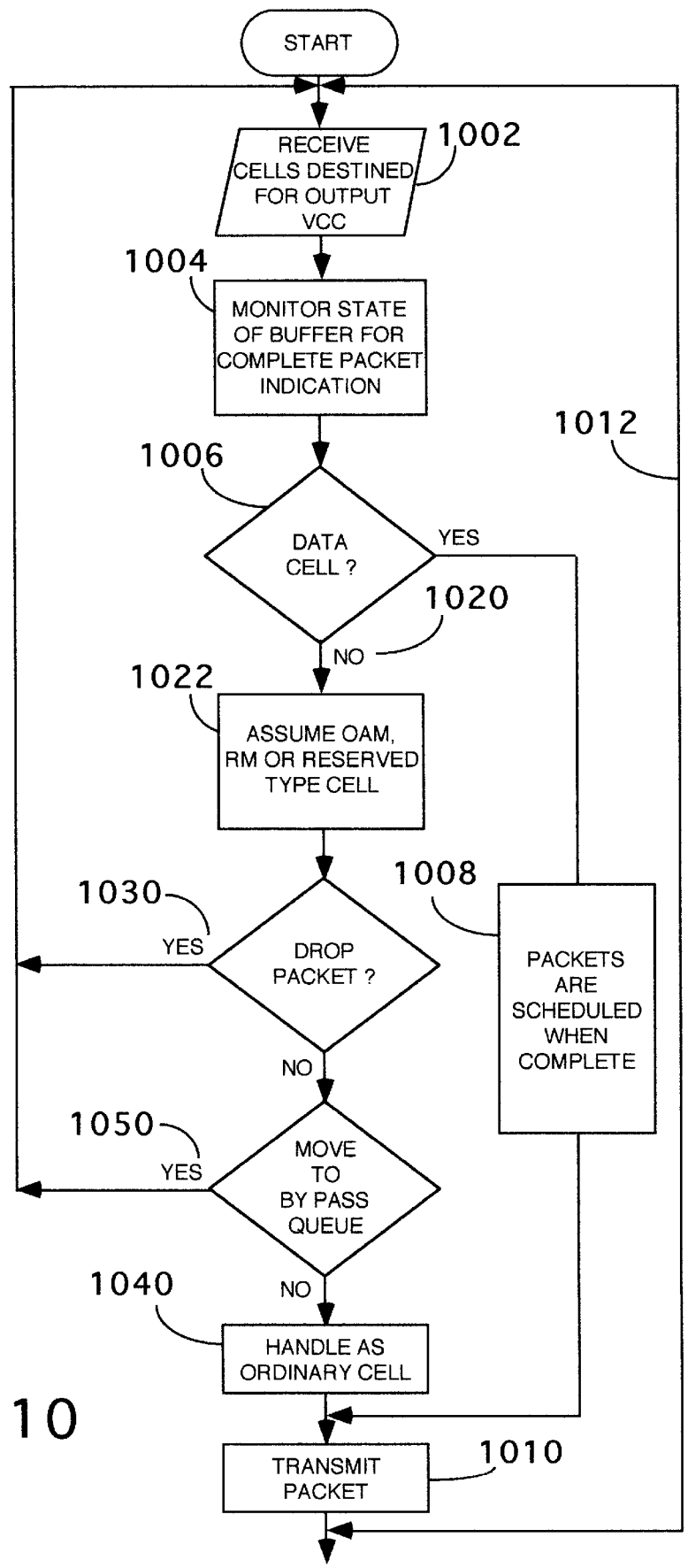
FIG. 10 is a flow chart of a scheduler according to the present invention.

FIG. 10 is a flow chart 1000 of a scheduler according to the present invention. Cells are received 1002 for buffering on a VCC mapped to an output VCC where packets are multiplexed. The scheduler monitors the state of the packet 1004 by looking at the PT identification field. The scheduler determines whether the packet is a data cell 1006. Data cells from the incoming VCCs are scheduled for transmission on the order they have all cells available 1008. After the scheduler schedules the transmission of a packet, the packet is transmitted continuously 1010, until all cells of that packet have been sent. Then, the scheduler transmits a next available complete packet of cells 1012 after the first identified complete packet of cells has been transmitted. If the packet is not a data cell 1020, the scheduler assumes that the cells are either Operations and Maintenance cells, Resource Management cells or reserved cells 1022. For the OAM, resource management and reserved cells, the scheduler chooses between three options. The cells may be dropped 1030, the cells may be buffered as ordinary cells in a cell buffer 1040, or the cells may be moved to a bypass queue 1050.

Figure 11:
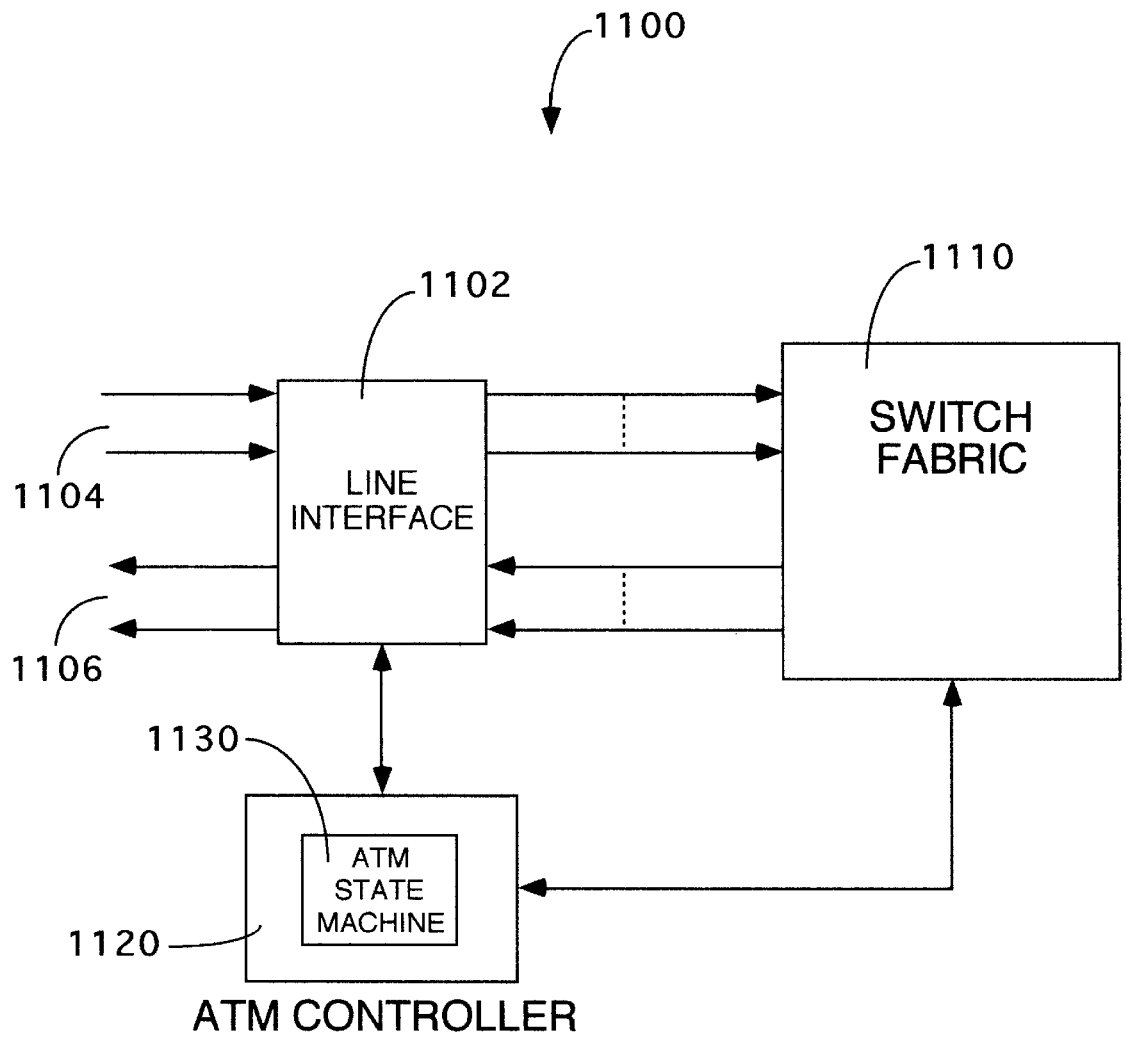
FIG. 11 illustrates a block diagram for a cell switch according to the present invention.

FIG. 11 illustrates a block diagram 1100 for an intermediate entity such as an ATM switch for supporting connections on multipoint-to-point topologies according to the present invention. The switch includes a line interface device 1102 having a plurality of input and output ports connected to a plurality of input 1104 and output 1106 virtual channel links. A switch fabric 1110 is operatively coupled to the line interface device 1102 for routing incoming cells received from incoming virtual channel links 1104 to outgoing virtual channel links 1106. A switch controller 1120 schedules the transmission of frames according to the process discussed above with reference to FIGS. 9 and 10. The switch controller 1120 may include a state machine 1130 for monitoring state information to identify when a complete frame has been received. However, those skilled in the art will recognize that other methods of obtaining the state of the received cells may be used without departing from the scope of the invention.

In summary, scheduler functions may be implemented as a simple round robin scheduler, where the scheduler goes through the buffer state list on a round robin fashion, and for the same priority connections, packets from the incoming VCCs are scheduled for transmission on the order they have all cells available. After scheduling for the packet from VCC to transmission, the packet is sent continuously, until all cells of that packet have been sent.

Additionally, scheduler functions can be extended to support fair or weighted scheduling, priorities, etc. Any extended scheduler functions may be provided as long as the scheduler does not send cells from incoming VCC out before the complete packet is available, and after such packet is scheduled for output it is send out continuously without interleaving any other cells on that VCC. Furthermore, those skilled in the art will recognize that the present invention may be implemented as stand-alone chip on the output data path, or integrated in the switch buffer management. Accordingly, costly complete assembly and reassembly of whole packets is not required. Further, the present invention can be implemented with minimum of additional hardware to existing ATM buffer management schemes.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method of scheduling the transmission of cells, comprising the steps:

receiving a plurality of cells from a plurality of virtual channel connections for multiplexing on a single virtual channel connection;

storing the cells for each of the virtual channel connections in a buffer until a complete packet has been received;

identifying when a buffer accumulates a complete packet of cells for one of the virtual channel connections; and scheduling complete packets from the buffers for transmission on the signal virtual channel connection in the order that the buffers accumulate a complete packet.

2. The method of claim 1 wherein the step of identifying when a buffer for a virtual channel connection accumulates a complete packet of cells further comprises the step of monitoring the state of the packet by looking at a packet type identification field in the cells.

3. The method of claim 1 further comprising the step of transmitting the cells of a complete packet continuously according to the schedule.

4. The method of claim 3 wherein the cells forming a first packet for a first virtual channel connection are transmitted until all the cells of the first packet from the first virtual channel connection have been transmitted.

5. The method of claim 3 further comprising the step of transmitting a next packet of cells after the first packet of cells has been transmitted.

6. The method of claim 1 where in the step of identifying when a buffer accumulates a complete packet of cells further comprises the step of determining whether the cells comprise a data cell, an Operations and Maintenance cell, a Resource Management cell or a reserved cell.

7. The method of claim 6 further comprising the step of dropping the buffered cells when the cells are determined to be an Operations and Maintenance cell, a Resource Management cell or a reserved cell.

8. The method of claim 6 further comprising the step of moving the buffered cells to a bypass queue when the cells are determined to be an Operations and Maintenance cell, a Resource Management cell or a Reserved Type of cell.

9. A network intermediate entity, comprising:
  a line interface device having a plurality of input and output ports connected to a plurality of virtual channel connections for receiving cells thereon;
  a switch fabric, operatively coupled to the line interface card for storing the cells for each of the virtual channel connections in a buffer until a complete packet has been received; and
  a switch controller, operatively coupled to the line interface device, for identifying when a buffer accumulates a complete packet of cells for one of the virtual channel connections;
  wherein the controller further comprises a scheduler for scheduling complete packets for transmission on a single virtual channel connection in the order that the buffers accumulate a complete packet.

10. The network intermediate entity of claim 9 wherein the switch controller monitors the state of the packet by looking at a packet type identification field in the cells.

11. The network intermediate entity of claim 9 further comprising the step of transmitting the cells of a complete packet continuously according to the schedule.

12. The network intermediate entity of claim 11 wherein the cells forming a first packet for a first virtual channel connection are transmitted until all the cells of the first packet from the first virtual channel connection have been transmitted.

13. The network intermediate entity of claim 11 wherein the scheduler transmits a next available complete packet of cells after the first identified complete packet of cells has been transmitted.

14. The network intermediate entity of claim 9 wherein the scheduler determines whether the cells comprise a data cell, an Operations and Maintenance cell, a Resource Management cell or a reserved cell.

15. The network intermediate entity of claim 14 wherein the scheduler drops the buffered cells when the cells are determined to be an Operations and Maintenance cell, a Resource Management cell or a reserved cell.

16. The network intermediate entity of claim 14 wherein the scheduler moves the buffered cells to a bypass queue when the cells are determined to be an Operations and Maintenance cell, a Resource Management cell or a Reserved Type of cell.

17. An intermediate device for transmitting cells, comprising:
  means for receiving a plurality of cells from a plurality of virtual channel connections for multiplexing on a single virtual channel connection;
  means, operatively coupled to the receiving means, for storing the cells for each of the virtual channel connections until a complete packet has been received;
  means, operatively coupled to the storing means, for identifying when the storing means accumulates a complete packet of cells for one of the virtual channel connections; and
  means, operatively coupled to the storing means, for scheduling complete packets from the buffers for transmission on the signal virtual channel connection in the order that the storing means accumulate a complete packet.

18. A method of multiplexing ATM cells from a plurality of virtual channel connections on to a signal virtual channel connections, comprising:
  receiving from a plurality of virtual channel connections ATM cells of a first type and a second type, wherein the second type comprises AAL-5 cells; storing the AAL-5 cells in a buffer until a complete packet is received; and
  multiplexing the cells of the first type and complete packets from the buffers on to the single virtual channel connection, the complete packets being prioritized according to the order that the buffers accumulate a complete packet.

* * * * *